United States Patent
Hasz et al.

(10) Patent No.: US 6,910,620 B2
(45) Date of Patent: Jun. 28, 2005

(54) METHOD FOR PROVIDING TURBULATION ON THE INNER SURFACE OF HOLES IN AN ARTICLE, AND RELATED ARTICLES

(75) Inventors: Wayne Charles Hasz, Pownal, VT (US); Nesim Abuaf, Lincoln, OR (US); Robert Alan Johnson, Simpsonville, SC (US); Ching-Pang Lee, Cincinnati, OH (US)

(73) Assignee: General Electric Company, Niskayuna, NY (US)

(*) Notice: Subject to any disclaimer, the term of this patent is extended or adjusted under 35 U.S.C. 154(b) by 286 days.

(21) Appl. No.: 10/271,098

(22) Filed: Oct. 15, 2002

(65) Prior Publication Data

US 2004/0072014 A1 Apr. 15, 2004

(51) Int. Cl.$^7$ .................. B23K 35/12; B23K 31/00; B05D 3/02
(52) U.S. Cl. .................. 228/245; 228/246; 228/248.1; 427/383.7
(58) Field of Search .................. 228/245, 246, 228/248.1; 427/375, 383.7

(56) References Cited

U.S. PATENT DOCUMENTS

| | | | |
|---|---|---|---|
| 3,666,006 A | 5/1972 | Valyi | |
| 4,003,716 A | 1/1977 | Steigelman et al. | |
| 4,064,914 A | 12/1977 | Grant | |
| 4,101,691 A | 7/1978 | Borchert | |

(Continued)

FOREIGN PATENT DOCUMENTS

WO 06771 2/1999

OTHER PUBLICATIONS

"Pastes, Transfer Tapes, Preforms", Praxair product brochure (3 pages).
"Drills & Cutters", prints from website www.dremel.com, Mar. 1999 (2 pages).
"Effects of Turbulator Profile and Spacing on Heat Transfer and Friction in a Channel", by M.E. Taslim and S.D. Spring, Journal of Thermophysics and Heat Transfer, vol. 8, No. 3, Jul.–Sep. 1994, pp. 555–562.
Copending U.S. Appl. No. 09/304,276, filed May 3, 1999, entitled "Article Having Turbulation and Method of Providing Turbulation on an Article ", by Wayne C. Hasz et al.
Copending U.S. Appl. No. 10/139,649, filed May 7, 2000, entitled "Methods to Form Cooling Passages on the Surface of a Turbine Part ", by V.S. Venkataramani et al.

Primary Examiner—Lynne R. Edmondson
(74) Attorney, Agent, or Firm—Ann M. Agosti; Patrick K. Patnode (57) ABSTRACT

A method of providing turbulation on the inner surface of a passage hole (e.g., a turbine cooling hole) is described. The turbulation is first applied to a substrate which can eventually be inserted into the passage hole. The substrate is often a bar or tube, formed of a sacrificial material. After the turbulation is applied to the substrate, the substrate is inserted into the passage hole. The turbulation material is then fused to the inner surface, using a conventional heating technique. The sacrificial substrate can then be removed from the hole by various techniques. Related articles are also described.

41 Claims, 5 Drawing Sheets

U.S. PATENT DOCUMENTS

| | | |
|---|---|---|
| 4,116,723 A | 9/1978 | Gell et al. |
| 4,154,293 A | 5/1979 | Fenner et al. |
| 4,154,294 A | 5/1979 | Notaro |
| 4,689,242 A | 8/1987 | Pike |
| 4,744,725 A | 5/1988 | Matarese et al. |
| 4,749,594 A | 6/1988 | Malikowski et al. |
| 4,938,991 A | 7/1990 | Bird |
| 5,106,010 A | 4/1992 | Stueber et al. |
| 5,196,232 A | 3/1993 | Kitazaki et al. |
| 5,306,401 A * | 4/1994 | Fierkens et al. ............ 415/232 |
| 5,319,179 A | 6/1994 | Joecks et al. |
| 5,353,865 A * | 10/1994 | Adiutori et al. ............ 165/133 |
| 5,361,828 A | 11/1994 | Lee et al. |
| 5,374,319 A | 12/1994 | Stueber et al. |
| 5,399,313 A | 3/1995 | Ross et al. |
| 5,549,927 A | 8/1996 | Cottone et al. |
| 5,820,744 A | 10/1998 | Edwards et al. |
| 5,927,946 A * | 7/1999 | Lee .......................... 416/97 R |
| 5,975,850 A | 11/1999 | Abuaf et al. |
| 6,142,734 A | 11/2000 | Lee |
| 6,598,781 B2 * | 7/2003 | Hasz et al. ................. 228/245 |

* cited by examiner

METHOD FOR PROVIDING TURBULATION ON THE INNER SURFACE OF HOLES IN AN ARTICLE, AND RELATED ARTICLES

BACKGROUND OF THE INVENTION

In a broad sense, this invention relates to methods for enhancing cooling efficiency in high temperature components. In some of the more specific embodiments, the invention is directed to providing roughness on the internal surfaces of cooling holes within turbine engine components.

A number of techniques are currently available for maintaining the temperature of turbine engine components below critical levels. As an example, coolant air from the engine compressor is often directed through the component, along one or more component surfaces. Moreover, relatively long radial cooling holes are often drilled through turbine blades, to serve as conduits for coolant air.

The radial cooling holes are often formed by a process known as Shaped Tube Electrolytic Machining, or "STEM drilling". The STEM process is an electrochemical machining technique which is especially useful for drilling small holes with large depth-to-diameter ratios. A very important advantage of this process is that it can be used to provide roughness to the inner surface of the cooling holes. The roughness greatly enhances heat transfer through the holes. STEM drilling is mentioned in various references, such as U.S. Pat. Nos. 5,927,946 and 5,820,744.

In brief, STEM systems often utilize one or more negatively-charged titanium tubes, an acid electrolyte, and a positively-charged substrate or work-piece. The electrolyte is pumped into the substrate, dissolving the metal in the pre-selected path of the cooling hole. In order to produce roughness within the holes, the injection of the electrolyte is intermittently stopped as the depth of the hole is being increased. This intermittent action results in the formation of protrusions along the length of the cooling holes. The protrusions provide the roughness and surface area required for the enhanced heat transfer.

While STEM drilling is a useful technique in many instances, it has some disadvantages also. For example, the process is very slow. Thus, when a significant number of holes have to be drilled, the considerable time required can result in high processing cost. The equipment required can also be quite expensive. Moreover, STEM drilling can produce etching debris which can decrease heat transfer efficiency in the hole, if not removed properly. Furthermore, STEM drilling sometimes results in inconsistent roughness patterns on the passage hole surface, which also can adversely affect heat transfer efficiency.

Thus, new methods for providing turbulation to the surface of passage holes in an article would be welcome in the art. The methods should be capable of securing the turbulation to any selected area of the hole wall. Moreover, the methods should allow one to change the shape, size, and pattern of the desired turbulation, as well as its composition. The methods should also be compatible with any other processes being used in conjunction with the article, and should not add excessive costs to the fabrication thereof.

SUMMARY OF THE INVENTION

One embodiment of the present invention calls for a method of providing turbulation on the inner surface of at least one passage hole. The passage hole can be located in a variety of different articles. One important example is a pattern of cooling holes for some portion of a turbine engine component, e.g., radial cooling holes which extend through a turbine blade. (As used herein the term "hole" is meant to embrace a variety of internal regions or cavities in an article, including indentations and hollow regions.). The turbine engine component is usually formed of a nickel- or cobalt-based superalloy material.

The turbulation is first applied to a substrate which can eventually be inserted into the passage hole. In many embodiments, the substrate, or "mandrel", is a bar or rod, formed of a sacrificial material, as described below. (The bar can be solid or hollow, and in the latter instance, is sometimes referred to as a "tube"). Turbulation material, often comprising a nickel- or cobalt-based metal alloy, can be applied to the substrate in various forms. For example, it can be applied freely as a powder, or as part of a slurry, metal foil, or tape (e.g., a green braze tape).

After the turbulation is applied to the substrate, the substrate can be inserted into the passage hole. The substrate is inserted to an extent sufficient to position the turbulation adjacent to a selected area of the inner surface of the hole. The turbulation material is then fused to the inner surface, using a number of heating techniques described below. The sacrificial substrate can then be removed from the hole by various techniques.

Other methods for applying turbulation to the substrate also constitute part of this invention. For example, the surface of the substrate can be provided with indentations which have dimensions corresponding to the turbulation desired for the passage hole. The indentations are filled with a bonding agent-turbulation composition, and the substrate is then inserted into the passage hole. Following the fusing step and the elimination of the substrate, the turbulation remains attached to the hole surface, via the bonding agent.

As another alternative, a relatively thin substrate (usually a bar or rod) can be used as the support for a number of rings. The rings encircle the bar, and are each formed of a bonding agent-turbulation composition. Rings formed of a sacrificial material can be alternated with the bonding agent-turbulation rings, along the length of the substrate. After insertion of the substrate-ring assembly into the passage hole, the substrate can be withdrawn, and the turbulation-containing rings can be fused to the wall of the hole. The sacrificial rings can be removed from the passage hole, as described below.

As another alternative, the substrate itself can be a metal foil, formed of the bonding agent material. Turbulation can be applied to the foil, and the foil can be cut to a size sufficient for fitting into the passage hole. The foil can then be rolled into a tube, with the turbulation disposed on its inner surface. The tube is then inserted into the passage hole, and fused thereto, so that the turbulation is bonded to the wall of the hole.

Yet another embodiment is directed to an article, comprising:

(I) a substrate containing at least one passage hole, wherein the passage hole includes an inner surface; and (II) turbulation material bonded to the inner surface of the passage hole by a bonding agent. As described herein, the article is often a turbine engine component, containing a number of radial cooling holes which include the turbulation.

Further details regarding the various features of this invention are found in the remainder of the specification.

DETAILED DESCRIPTION OF THE INVENTION

The passage holes described in this specification can be formed within any metallic material or alloy. Usually (but not always), the metallic material is a heat-resistant alloy designed for high-temperature environments, such as those above 1000° C. As defined herein, "metal-based" refers to materials that are primarily formed of metal or metal alloys, but which may contain some non-metallic material as well.

Some heat-resistant alloys are "superalloys", including cobalt-based, nickel-based, and iron-based alloys. In one embodiment, the superalloy is a material in which nickel or cobalt is the single greatest element, by weight. Illustrative nickel-based alloys include at least about 40 wt % Ni, and at least one component from the group consisting of cobalt, chromium, aluminum, tungsten, molybdenum, titanium, and iron. Illustrative cobalt-based alloys include at least about 30 wt % Co, and at least one component from the group consisting of nickel, chromium, aluminum, tungsten, molybdenum, titanium, and iron. While the type of article in which the passage hole is located can vary widely, it is often in the form of a turbine engine part, such as a combustor liner, combustor dome, bucket or blade, nozzle or vane.

The turbulation can be formed of any material that, upon fusing to the passage hole surface, forms a plurality of protuberances that extend beyond the surface. This plurality of protuberances appears as a roughened surface. Frequently, the turbulation material comprises a particulate phase of discrete particles bonded to the passage hole surface. The particulate phase of discrete particles may be formed from a coarse powder, described in more detail below. Turbulation material is also generally described in pending U.S. patent application Ser. No. 09/304,276, filed on May 3, 1999 (W. Hasz et al), which is incorporated herein by reference.

The turbulation material is often formed of a material similar to that of the article in which the passage hole is located. Usually, the turbulation powder comprises at least one element selected from the group consisting of nickel, cobalt, aluminum, chromium, silicon, iron, and copper. The powder can be formed of a superalloy bond coat composition for thermal barrier coating (TBC) systems. As an example, it can be a superalloy composition of the formula MCrAl(X), where M is an element selected from the group consisting of Ni, Co, Fe, and combinations thereof; and X is an element selected from the group consisting of Y, Ta, Si, Hf, Ti, Zr, B, C, and combinations thereof. The MCrAl(X) materials generally have a composition range of about 17.0–23.0% chromium; about 4.5–12.5% aluminum; and about 0.1–1.2% yttrium; with M constituting the balance. In some embodiments, the turbulation powder particles have an average particle size within the range of about 125 microns to about 4000 microns. In some preferred embodiments, the average size is within the range of about 180 microns to about 600 microns.

In this invention, the turbulation is applied to pre-existing passage holes. In most instances, these passage holes initially have smooth surfaces. (However, this process can be used to apply turbulation to holes which already have rough surfaces, or partially-rough surfaces). Techniques for forming the passage holes are well-known in the art. For example, the holes can be provided in many types of articles by casting. Moreover, a STEM technique can be used to prepare smooth-bore holes, i.e., by carrying out the process in a "continuous" mode. For certain types of articles, the holes can be formed by other types of drilling techniques, e.g., laser drilling, electrical discharge machining (EDM), and gun-barrel boring techniques. The holes often have a length of about 1 inch (2.5 cm) to about 25 inches (63.5 cm). Moreover, they often have a length-to-diameter ratio in the range of about 20:1 to about 100:1.

As mentioned above, the turbulation material is first applied to a substrate, e.g., to a mandrel or other type of removable support. Many different types of substrates may be used for this purpose. The size and shape of the substrate can vary considerably, as long as it is capable of being inserted into the passage hole. It also must be capable of retaining the turbulation on its surface, and then "releasing" or transferring the turbulation to the surface of the passage hole in a subsequent heating step.

Figure 1:
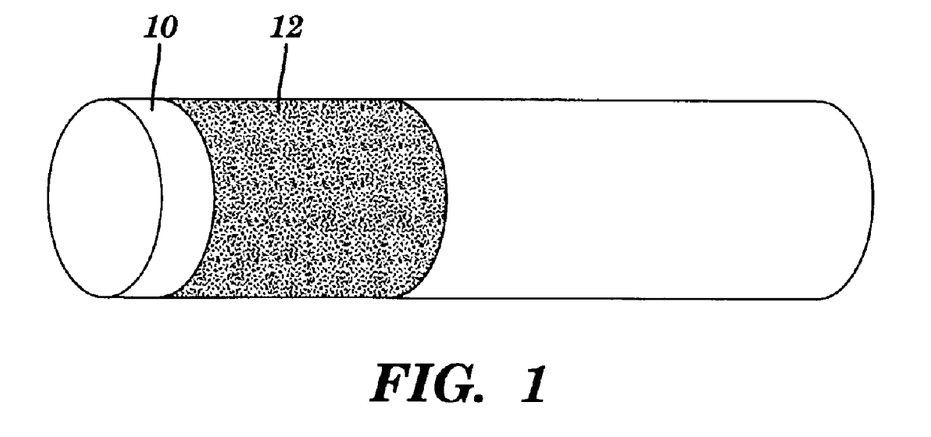
FIG. 1 is an illustration of a cylindrical, metal mandrel on which turbulation has been applied.

In one embodiment, the substrate is a bar 10, as shown in FIG. 1. The bar has a length sufficient to include turbulation 12 for a desired length of the passage hole. The shape of the bar will be determined by the shape of the hole. Usually, it is substantially cylindrical, as shown in this figure.

In some of the preferred embodiments, the bar is formed of a sacrificial material. In other words, such a material can be removed from the passage hole after the turbulation is fused to the hole surface. A variety of sacrificial materials can be used. Many are described in pending U.S. patent application Ser. No. 10/139,659, filed on May 7, 2002, which is incorporated herein by reference. Those skilled in the art can determine the most appropriate material for a selected article and type of bonding agent (described below). The sacrificial material should be capable of being removed from the hole, without undue effort. Removal conditions (e.g., thermal conditions) should not adversely affect the hole or its surrounding regions.

Non-limiting examples of sacrificial materials include metal oxides, metal salts, metal halides, metal borates, metal sulfates, metal aluminates, and combinations thereof. Some specific examples are sodium chloride, potassium borate, nickel chloride, magnesium sulfate, nickel fluoride, sodium aluminate; and mixtures of sodium aluminate and sodium aluminosilicate. When used in the form of a paste, many of these compounds are combined with a binder and/or a solvent. Non-limiting examples of the binders are water-based gels, e.g., Vitta Gel™ and polyethylene oxide. Examples of solvent-based binder systems are those based on polyvinyl butyral. Choice of a particular solvent will depend on the type of binder used. Typical examples include water, alcohols, acetone, sodium hydroxide solutions, and potassium hydroxide solutions. Those skilled in the art are familiar with techniques for forming these materials into various substrate shapes, such as a cylindrical bar.

In some preferred embodiments, carbon-based materials are used to form the substrate. Examples include graphite, as well as mixtures which contain graphite. Graphite-based substrates can easily be molded into a desired shape. Moreover, graphite can be easily removed from the passage hole when necessary, e.g., by combustion techniques.

There are a number of ways to apply turbulation to bar 10. Many of them are generally discussed in the previously-referenced patent applications. In one instance, particles of turbulation can be freely applied to or "sprinkled" over the bar. Usually, the bar would first be coated (e.g., by spraying or dipping) with any type of binder, to provide temporary adhesion for the turbulation particles. The binder is typically based on a liquid medium like water or an organic solvent. Conventional binders may include organic materials, such as polyethylene oxide and various acrylics. (Solvent-based binders can also be used).

After the turbulation material is applied to the bar, a bonding agent can be applied over the material. In many preferred embodiments, the bonding agent is a braze material. Such materials are well-known in the art, and often comprise at least one metal selected from the group consisting of nickel, cobalt, iron, a precious metal, and a mixture which includes at least one of the foregoing. Some braze compositions are described in the "Kirk-Othmer Encyclopedia of Chemical Technology", 3rd Edition, Vol. 21, pages 342 et seq. The composition of the braze alloy is preferably similar to that of the article in which the hole is located. For example, if the article is formed of a nickel-based superalloy, the braze alloy can be formed of a similar nickel-based superalloy composition (usually containing at least about 40% by weight nickel). The braze alloy composition may also contain silicon and/or boron, which serve as melting point suppressants.

Exemplary nickel-base braze alloy compositions are provided below. The components are designated in weight percent:

1) 4.5 Si, 14.5 Cr, 3.3 B, and 4.5 Fe, balance Ni;
2) 15 Cr, 3.5 B, balance Ni;
3) 4.5 Si, 3 B, balance Ni;
4) 4.2 Si, 7 Cr, 3 B, and 3 Fe, balance Ni;
5) 10 Si, 19 Cr, balance Ni;
6) 3.5 Si, 22 Co, 2.8 B, balance Ni;
7) 3.5 Si, 1.8 B, balance Ni;
8) 4.5 Si, 14 Cr, 3 B, and 4.5 Fe, balance Ni;
9) 17 Cr, 9 Si, 0.1 B, balance Ni;
10) 2.6 Si, 2 Cr, 2 B, and 1 Fe, balance Ni;
11) 15 Cr, 8 Si, balance Ni;
12) 10.1 Si, 19.0 Cr, balance Ni;
13) 4.5 Fe, 4.5 Si, 14.0 Cr, 3.1 B, 0.75 C, balance Ni;
14) 4.5 Fe, 4.5 Si, 14.0 Cr, 3.1 B, balance Ni;
15) 4.5 Si, 3.1 B, balance Ni;
16) 11.0 P, balance Ni;
17) 10.1 P, 14.0 Cr, balance Ni; and
18) 19 Cr, 7.3 Si, 1.5 B, balance Ni.

Some preferred nickel-base braze alloy compositions for the present invention comprise at least one of silicon, chromium, boron, and iron, with the balance being nickel. Silicon is sometimes preferred over boron. Mixtures of silicon and boron are sometimes employed. As one particular, non-limiting example, some of these compositions comprise about 5 wt % to about 15 wt % silicon or boron; and about 15 wt % to about 25 wt % chromium, with the balance being nickel.

Exemplary cobalt-base braze alloy compositions include:

1) 8 Si, 19 Cr, 17 Ni, 4 W, 0.8 B, balance Co; and
2) 17.0 Ni, 1.0 Fe, 8.0 Si, 19.0 Cr, 0.8 B, 0.4 C, balance Co.

Other types of braze alloys could be used as well. Non-limiting examples include precious metal compositions containing silver, gold, and/or palladium, in combination with other metals, such as copper, manganese, nickel, chrome, silicon, and boron. Mixtures which include at least one of the braze alloy elements are also possible. Many of the metal braze compositions are available from Praxair Surface Technologies, Inc.

The bonding agent, exemplified by a braze material, can be applied over the turbulation in the form of a bonding sheet or layer. As an example, the bonding sheet can be in the form of green braze tape which is wrapped or rolled around the bar. Green braze tapes are commercially available. Examples include the Amdry line of braze tapes, available from Sulzer Metco. An exemplary grade is Amdry® 100. The tapes can alternatively be made by conventional techniques, as described in the referenced patent application Ser. No. 09/304,276. (Alternatively, the bonding sheet can be in the form of a metal foil).

Figure 2:
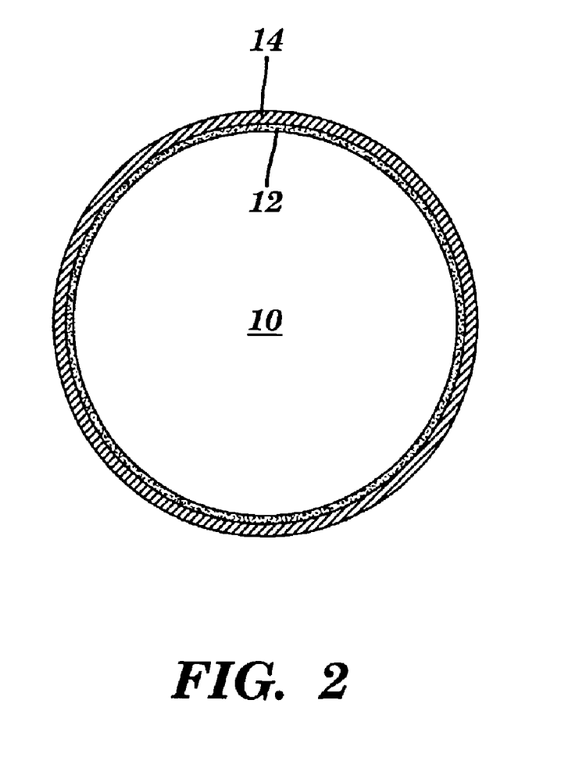
FIG. 2 is a cross-sectional view (end-view) of the cylindrical mandrel of FIG. 1, after application of a bonding agent.

FIG. 2 represents a cross-section (end-view) of the cylindrical bar (substrate) of FIG. 1, after application of the bonding agent. Bar 10 includes a layer of turbulation 12, which is, in turn, covered by a braze layer 14. The bar can at this point be inserted into a passage hole, manually or mechanically. (As one illustration, a robotic system can be used to insert multiple bars—each into a different passage hole). The bar will be inserted to the extent necessary to position turbulation 12 adjacent a selected region of the internal surface of the passage hole.

After the bar is positioned in a desired location within the passage hole, a heat treatment is undertaken. The heat treatment fuses the turbulation material to the inner surface of the hole. The particular heat treatment employed can vary, and depends in part on the type of bonding agent present. (The heat treatment usually should provide heat to the bonding agent, the turbulation material, and the underlying metal of the passage hole, for adequate fusing). In the case of a braze-type bonding agent, a conventional brazing operation can be used, as described in Ser. No. 09/304,276. (As used herein, "brazing" is generally meant to include any method of joining metals that involves the use of a filler metal or alloy).

Brazing temperatures depend in part on the type of braze alloy used, and are typically in the range of about 525° C. to about 1650° C. In the case of nickel-based braze alloys, braze temperatures are usually in the range of about 800° C. to about 1260° C. When possible, brazing is often carried out in a vacuum furnace. The amount of vacuum will depend in part on the composition of the braze alloy. Usually, the vacuum will be in the range of about $10^{-1}$ torr to about $10^{-8}$ torr, achieved by evacuating ambient air from a vacuum chamber, to the desired level. Those skilled in the art may be familiar with other heating techniques suitable for fusing the turbulation material within the passage hole.

The heating step fuses the bonding agent (e.g., the braze material) to the inner surface of the passage hole. When the bonding agent cools, it forms a metallurgical bond to the wall of the hole. The turbulation material is mechanically retained within the bonding layer, e.g., the solidified braze matrix material. The turbulation thereby protrudes into the passageway, so as to perform its function, e.g., for enhanced heat transfer.

After the bonding agent is fused to the surface of the passage hole, the substrate (e.g., the mandrel) can be removed from the hole. In some instances, the substrate is simply withdrawn, intact, from the hole. However, in preferred embodiments, it is removed by some sort of technique which decomposes the substrate (i.e., a sacrificial substrate). The particular technique depends in part on the composition of the substrate. The technique should be one which will not adversely affect the passage hole or the article in which it is incorporated. (As an example, strong acids could remove many types of substrates, but could also damage surrounding metallic components).

An aqueous wash may be used as the removal technique for a water-soluble substrate material. Chemical leaching or vacuum extraction might be used for other types of materials. Etching with solvents such as water, alcohols, acetone, or alkali metal hydroxides may also be employed. Another technique which is sometimes suitable is ultrasonic removal.

If the substrate material is organic (e.g., graphite) or partially organic, combustion could be employed. For example, the article itself could be heated to a temperature high enough to volatize or burn-off the substrate material. Residual debris could then be removed by an air-blast, alone or in combination with one of the other techniques mentioned above.

In another embodiment of the invention, the turbulation material is first applied to the substrate (e.g., the mandrel) in the form of a slurry which also contains the bonding agent. As an example, a slurry composition containing a liquid medium, braze alloy powder, and turbulation powder can be prepared by simple mixing techniques. (The slurry may optionally contain a binder, and the liquid medium may function as a solvent for the binder.) The liquid medium may be water or an organic component, or mixtures thereof, as described previously.

The slurry can be deposited by various techniques. For example, it can be sprayed, painted, or tape-cast directly onto the substrate. The slurry can then be allowed to dry, thereby evaporating all of the volatile material. Alternatively, a conventional heating step can be carried out, to accelerate removal of the volatiles. The substrate containing the turbulation and bonding agent can then be inserted into the passage hole, as described previously.

Figure 3:
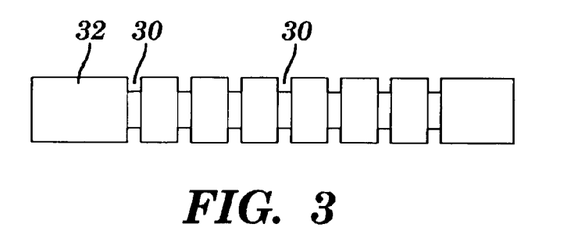
FIG. 3 is a side-elevational view of an indented cylindrical mandrel.
Figure 4:
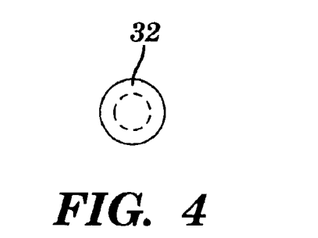
FIG. 4 is a right side-view of the mandrel of FIG. 3.

As another alternative, a pattern of indentations can be formed within the surface of the substrate, as depicted in FIGS. 3 and 4. Each indentation 30 in substrate 32 (e.g., a cylindrical bar) has a dimension which is reciprocal to the dimension of a corresponding, desired turbulation site on the inner surface of a passage hole. Methods for patterning and forming the indentations are well-known in the art. For example, a machining technique—often controlled by computer—can be used for this purpose.

Figure 5:
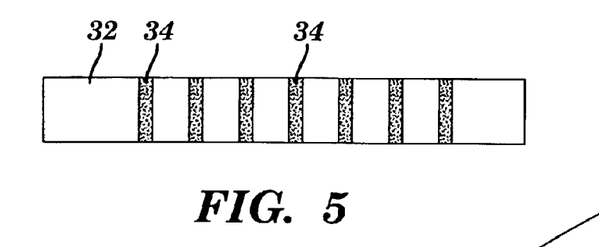
FIG. 5 is an illustration of the mandrel of FIG. 3, after the indentations have been filled with a metal-binder material.

The indentations 30 are then filled with a composition 34 of bonding agent and turbulation material, as shown in FIG. 5. Each of these components has been described previously. A binder is also usually present. (However, those familiar with metallic powder technology are aware of other techniques for keeping the turbulation particles and bonding agent particles reasonably adherent to each other). The bonding agent is usually a braze material, and an additional solvent may be added to adjust the viscosity. The composition usually has a paste-like viscosity. It can be deposited in the indentations by any convenient technique, e.g., trowelling, or injection. As an optional, additional step, a layer of bonding agent can be wrapped or rolled around the bar, covering the indentations filled with composition 34. As described previously, the bonding layer used for wrapping is often a green braze tape.

Figure 6:
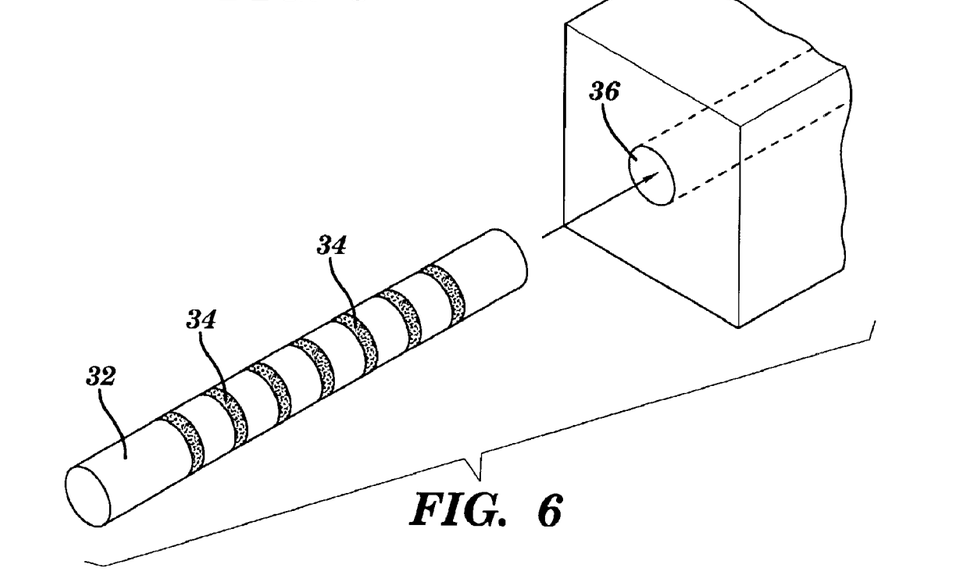
FIG. 6 is an illustration of the mandrel of FIG. 5, while being inserted into a passage hole.

The substrate is then inserted into passage hole 36, as shown in FIG. 6. After the substrate is positioned in the desired location, a heat treatment is carried out to fuse the turbulation to the hole wall with the bonding agent. In most cases, the bonding agent is a braze, and the brazing technique is as described previously.

Figure 7:
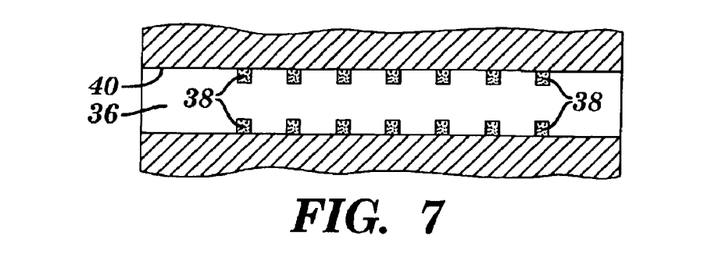
FIG. 7 illustrates the passage hole of FIG. 6, after removal of the mandrel.

After the fusing step, substrate 32 can be removed by one of the techniques described above. A removal technique which includes combustion is sometimes preferred, if the substrate material is combustible. For example, a vacuum-brazing step used for fusing can be followed by an air-heating step, so as to oxidize and thus remove a graphite-type substrate material. (Care should be taken to avoid temperatures which could damage the surrounding passage hole wall). After removal of the substrate, the residual turbulation 38 remains fused to the inner wall 40 of hole 36, as depicted, in cross-section, in FIG. 7. (The drafting lines which define the edge of the turbulation in this cross-sectional view have been omitted, for simplicity).

Figure 8:
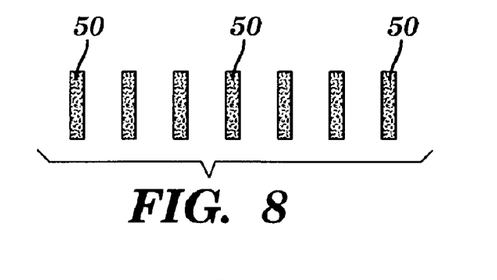
FIG. 8 is a depiction of a set of turbulation-forming rings for emplacement on a mandrel.
Figure 9:
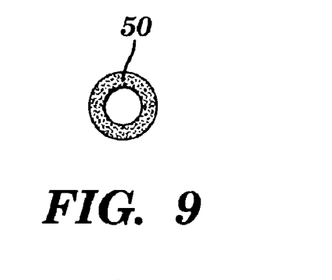
FIG. 9 is a right side-view of FIG. 8.

In another embodiment of the invention, the turbulation material can be combined with a bonding agent to form rings or "washers" of material. (A binder is usually included also). The particular shape of turbulation-bonding agent rings 50 in FIGS. 8 and 9 will depend on the desired shape of the turbulation. For example, various rectangular shapes could be used, rather than a circular shape. A variety of irregular shapes could alternatively be used, depending, for example, on coolant flow models. (Furthermore, individual rings of the turbulation/bonding agent material could have different shapes). The rings can be shaped by any convenient technique, such as molding.

Figure 10:
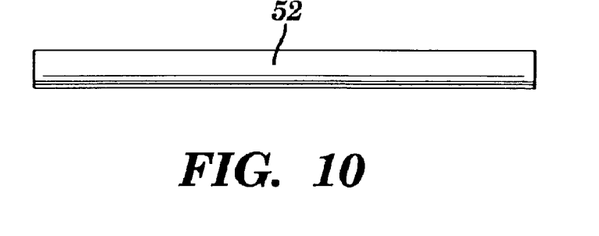
FIG. 10 is a side-elevational view of a cylindrical mandrel.
Figure 11:
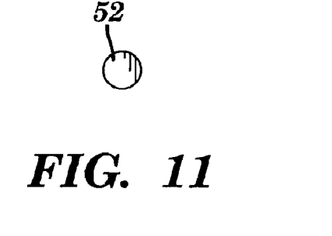
FIG. 11 is a right side-view of FIG. 10.

Rings 50 are then inserted over removable substrate 52 (e.g., a cylindrical support bar, shown in FIGS. 10 and 11), and positioned according to the desired location of the turbulation. The rings can be temporarily held in the proper place on the substrate, before being fused to the passage hole wall, by various techniques. As one example, the ring material could be exposed to a solvent that partially dissolves and plasticizes the binder in the bonding agent material. This exposure would cause the structure to conform and adhere to the substrate surface.

An advantage of this embodiment is that the thickness or diameter of substrate 52 can be significantly reduced, as compared to previous embodiments. As a result, the volume of the substrate which has to be removed after the turbulation has been fused to the hole wall is also reduced, because the substrate can be removed beforehand. This can represent a significant processing attribute in some situations.

Figure 12:
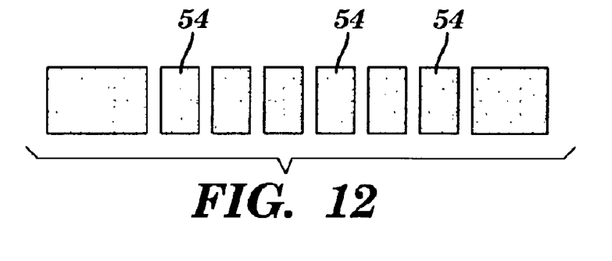
FIG. 12 is a depiction of a set of sacrificial rings for emplacement on a mandrel.
Figure 13:
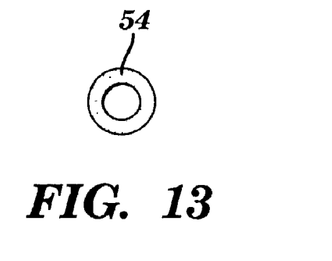
FIG. 13 is a right side-view of FIG. 12.
Figure 14:
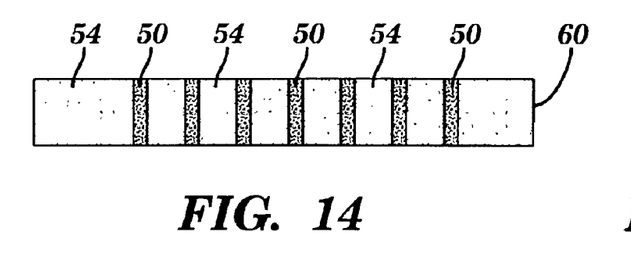
FIG. 14 is a depiction of the mandrel of FIG. 10, after sets of rings have been assembled thereon.

In some instances, rings or washers formed of a sacrificial material can also be inserted over the substrate. For example, sacrificial rings 54, shown in FIGS. 12 and 13, can be inserted along the length of bar 52 (FIG. 10), intermittently with the insertion of the turbulation-bonding agent rings 50. The sacrificial rings provide a desired separation between individual turbulation-bonding agent rings, as shown in FIG. 14. Sacrificial rings 54 are usually formed of a type of material like that of the substrate, e.g., an oxide or graphite. Thus, the sacrificial rings can easily be removed (along with the substrate), after the turbulation has been fused to the hole wall. The size of the sacrificial rings will depend in large part on the desired position of the adjacent turbulation-bonding agent rings 50. (As in an embodiment described previously, a separate layer of bonding agent, e.g., green braze tape, can optionally be wrapped or rolled around the bar, covering rings 50 and 54).

Figure 15:
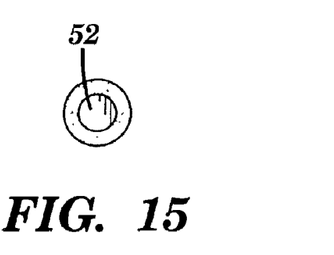
FIG. 15 is a right side-view of FIG. 14.
Figure 16:
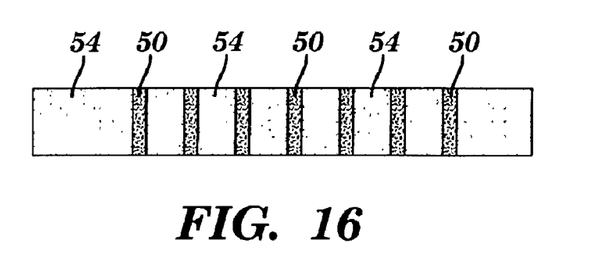
FIG. 16 illustrates the assembly of rings in FIG. 14, as they would appear in a passage hole, after removal of the mandrel.
Figure 17:
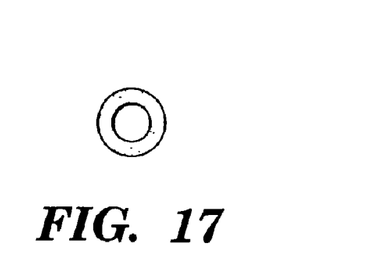
FIG. 17 is a right side-view of FIG. 16.

FIGS. 14 and 15 depict mandrel/substrate 60, containing turbulation-bonding agent rings 50, and sacrificial rings 54. (The rings alternate in this depiction, but could be arranged in any pattern). As assembled, the mandrel can be inserted into the passage hole, as described previously. After insertion, the substrate, i.e., inner support bar 52, can be withdrawn, leaving rings 50 and 54 in their proper positions within the hole. FIGS. 16 and 17 depict the ring assembly itself, after removal of support bar 52. Prior to the application of heat for fusing, the rings can be temporarily held in place within the hole, by various techniques. For example, a solvent which partially dissolves and plasticizes any binder in the rings can be sprayed into the hole, causing the rings to stick to the hole wall.

Removal of the inner support bar 52 significantly reduces the amount of material which has to be combusted or otherwise removed after the fusing step. A conventional heating step (e.g., brazing) can then be undertaken to fuse the turbulation to the passage hole wall. The sacrificial rings 54 can then be removed by one or more of the techniques described previously, e.g., etching, chemical leaching, or combustion. (It should also be noted that inner support bar 52 can remain in the passage hole during fusing of the turbulation material, and then be removed afterward, e.g., by the technique used to remove the sacrificial rings).

In another embodiment of the invention, the substrate can be a metal foil which is formed of the bonding agent material, e.g., a braze. The foil has a surface area sufficient to cover a portion of the inner surface of the passage hole on which turbulation is desired. Various techniques can be used to make such a foil. Many are taught in the two previously-referenced patent application Ser. No. 09/304,276 and Ser. No. 10/139,659. As one example, a mixture of metallic powder material and binder is tape-cast onto a removable support sheet. The metallic powder is usually, but not always, similar to the material forming the article in which the passage hole is located. After tape-casting, the support sheet is removed, and the remaining green sheet is then sintered into a "pre-form" foil, e.g., by using a vacuum heat treatment.

As another example for preparing the metal foil, the metallic powder material can first be deposited onto a support sheet as a thin layer of metal. Various thermal spray techniques are usually used for the deposition, such as vacuum plasma deposition, HVOF (high velocity oxy-fuel), or air plasma (AP) spray. The support sheet is then removed, leaving the desired metal foil. As still another alternative, an amorphous metal ribbon technique could be used to make the foil, as described in patent application Ser. No. 09/304,276.

Turbulation material, in powder form, can then be applied to a first surface of the foil. (The surface of the foil is sometimes coated with an adhesive first, so that the turbulation stays in place). Moreover, the turbulation can be patterned on the foil surface, as discussed in the referenced patent applications. The foil is cut to a dimension sufficient to cover a desired portion of the inner surface of the passage hole.

Figure 18:
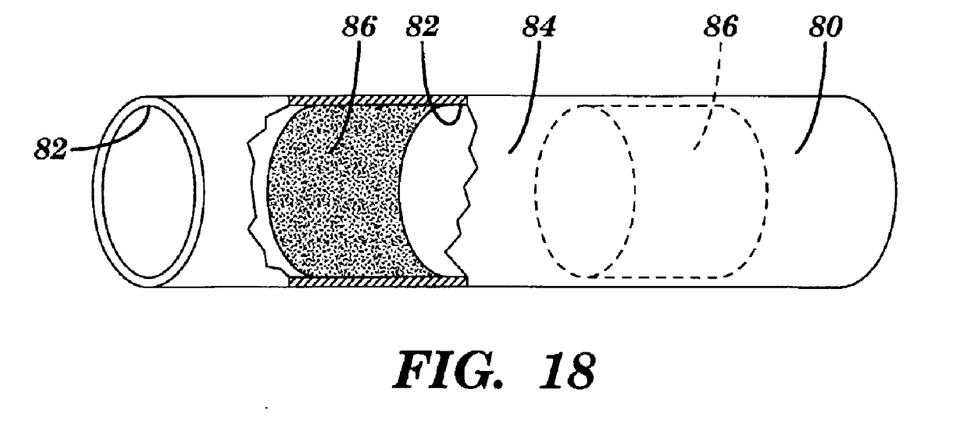
FIG. 18 illustrates another embodiment of the invention, in which turbulation has been applied to the interior surface of a cylindrical, hollow mandrel formed from a metal foil.

The foil can then be rolled up to form the substrate, e.g., a cylindrical tube. FIG. 18 depicts such a tube or rod 80, including first surface 82 (its inner surface) and second surface 84 (its outer surface). Turbulation 86, shown in a cut-away section of tube 80, is disposed on inner surface 82. The tube is rolled up to a diameter small enough to fit inside the selected passage hole.

The foil-tube 80 can then be inserted into a passage hole. Once it is in the hole, the spring-like nature of the metal foil should cause it to expand and contact the interior surface of the hole. The turbulation 86 of inner surface 82 of the foil protrudes into the hole passage, while outer surface 84 of the foil is closest to the hole wall. Prior to the fusing step, the foil can be temporarily held in place by various techniques. Exemplary techniques include spot-welding, tack-welding, use of adhesives, and the like. The foil and surrounding area can then be heated to a temperature sufficient to fuse the turbulation to the wall of the hole, as described previously.

Figure 19:
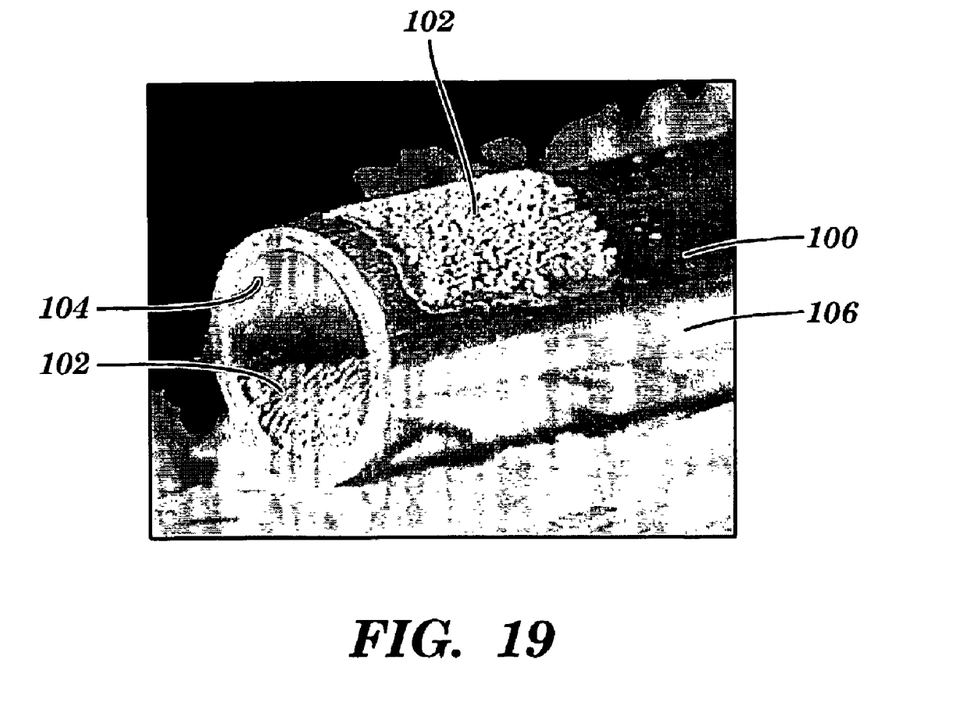
FIG. 19 is a photograph of a section of a superalloy tube on which turbulation has been applied.

FIG. 19 is a photograph of a section of a superalloy tube 100. Turbulation 102 has been applied to inner surface 104 and outer surface 106 of the tube, using a brazing agent. (This invention is specifically related to turbulation applied to the inner surface of the tube). The integrity of the turbulation, e.g., its adhesion to the tube surfaces, is equal to the integrity of turbulation formed or applied by prior art techniques.

Figure 20:
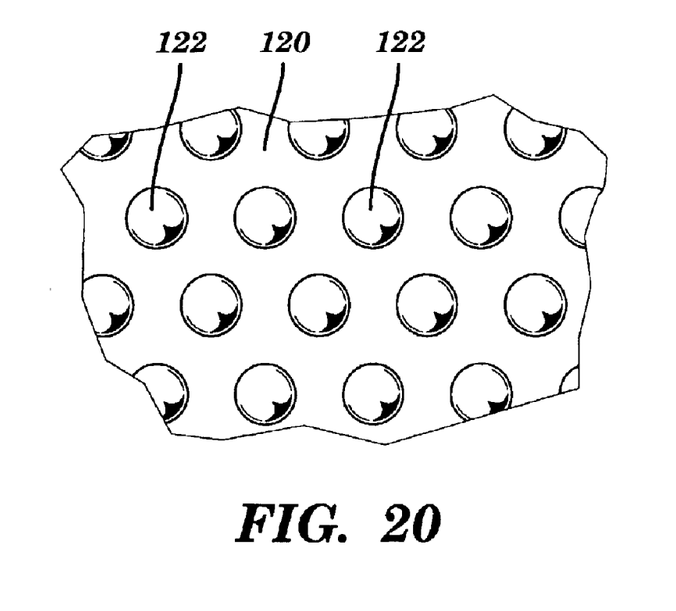
FIG. 20 is a partial section of a brazing sheet containing turbulation.

Yet another embodiment of this invention is directed to an article, including a substrate which contains at least one passage hole. As described previously, the article can be in the form of many different types of components. It is often a turbine engine part, e.g., a turbine blade, and may contain a number of radial cooling holes (e.g., about 5 to about 50 holes). The article further includes turbulation material, e.g., a metal alloy, bonded to at least a portion of the inner surface of the passage hole. The turbulation extends beyond the inner surface, i.e., into the pathway of the hole, and usually forms a plurality of protuberances. The protuberances can be disposed in a pre-selected pattern, and their size and shape can be adjusted as desired. As discussed above, the protuberances are frequently used to enhance heat transfer when the passage holes are functioning as cooling holes. FIG. 20 provides an illustration of a partial section of a brazing sheet 120, containing turbulation 122. As mentioned previously, the turbulation material is mechanically retained within the solidified braze matrix material.

The following examples are merely illustrative, and should not be construed to be any sort of limitation on the scope of the claimed invention. All parts are provided in weight percent, unless otherwise indicated.

EXAMPLE

Turbulation was applied to the inner surface of a number of stainless steel tubes. In each instance, a commercial, tape-cast, green braze tape was employed: Amdry® 100 (composition: 10% by weight silicon; 19% by weight chrome, balance nickel). The tape had a thickness of about 75–125 microns, and was coated with a very thin organic adhesive. A coarse NiCrAlY bond coat powder was employed as the turbulation material, having an approximate composition as follows: 68 wt % Ni, 22 wt % Cr, 9 wt % Al, and 1 wt % Y. The powder had an average particle size (diameter) of 50–80 mesh, i.e., 180–300 microns, and was manually applied to the braze tape surface. For some of the samples, the turbulation powder was patterned on the tape surface.

Each tape was inserted into one of the tubes (0.25 in/0.64 cm inner diameter). The tape was then brazed within the tube, by placing the tube in a vacuum furnace maintained at about 2150° F. (1177° C. ($10^{-5}$ torr), for about 30 minutes. The brazing served to securely fuse the turbulation to the inner surface of the tube.

The turbulation provided the inner surface of the tube with a rough texture. The $R_a$ value was about 2.7 mils (68.6 microns), and the $R_z$ value was about 13.5 mils (343 microns). This roughness profile serves to enhance heat transfer through the tube.

Having described preferred embodiments of the present invention, alternative embodiments may become apparent to those skilled in the art without departing from the spirit of this invention. Accordingly, it is understood that the scope of this invention is to be limited only by the appended claims.

All of the patents, articles, and texts mentioned above are incorporated herein by reference.

What is claimed:

1. A method of providing turbulation on the inner surface of a passage hole, comprising the following steps:
    (a) applying turbulation material to a substrate which is capable of being inserted into the passage hole and being fused to the inner surface of the passage hole;
    (b) inserting the substrate into the passage hole, so that the substrate is adjacent to the inner surface of the passage hole; and
    (c) fusing the turbulation material to the inner surface of the passage hole.
2. The method of claim 1, wherein the turbulation material comprises a metal alloy.
3. The method of claim 2, wherein the metal alloy comprises at least one element selected from the group consisting of nickel, cobalt, aluminum, chromium, silicon, iron, and copper.
4. The method of claim 2, wherein the metal alloy comprises MCrAl(X), and M is an element selected from the group consisting of Ni, Co, Fe, and combinations thereof; and X is an element selected from the group consisting of Y, Ta, Si, Hf, Ti, Zr, B, C, and combinations thereof.
5. The method of claim 1, wherein the substrate is a bar.
6. The method of claim 5, wherein a bonding agent is also applied to the bar.
7. The method of claim 6, wherein the bonding agent comprises a braze alloy.
8. The method of claim 7, wherein the braze alloy comprises at least one metal selected from the group consisting of nickel, cobalt, iron, a precious metal, and a mixture which includes at least one of the foregoing.
9. The method of claim 8, wherein the braze alloy comprises at least about 40% by weight nickel, and at least one additional element selected from the group consisting of silicon, chromium, boron, and iron.
10. The method of claim 6, wherein the bonding agent is in the form of a sheet.
11. The method of claim 10, wherein the sheet comprises a green braze tape.
12. The method of claim 10, wherein the sheet comprises a metal foil.
13. The method of claim 6, wherein the turbulation material comprises a particulate phase of discrete metal alloy particles, having an average particle size within a range of about 125 microns to about 4000 microns.
14. The method of claim 6, wherein the turbulation material is applied directly to the surface of the bar, prior to the application of the bonding agent.
15. The method of claim 14, wherein a binder material is used to provide temporary adhesion of the turbulation to the bar.
16. The method of claim 14, wherein the turbulation material and the binder are in the form of a slurry which is applied directly to the surface of the bar.
17. The method of claim 14, wherein the bonding agent is applied in the form of a layer over the turbulation material.
18. The method of claim 17, wherein the layer of bonding agent is wrapped around the bar, so as to cover the discrete metal alloy particles.
19. The method of claim 18, wherein the bonding agent comprises a braze alloy.
20. The method of claim 18, wherein the bar is cylindrical.
21. The method of claim 18, wherein the bar comprises a sacrificial material which is removed from the passage hole, after the turbulation material is fused to the inner surface of the passage hole.
22. The method of claim 21, wherein the sacrificial material is selected from the group consisting of metal oxides, metal salts, metal halides, metal borates, metal sulfates, metal aluminates, carbon-based materials, and combinations thereof.
23. The method of claim 21, wherein the sacrificial material is removed from the passage hole by a technique selected from the group consisting of aqueous washing; chemical leaching, vacuum extraction, etching, ultrasonic processes, combustion, and combinations of these techniques.
24. The method of claim 5, wherein the surface of the bar contains a pattern of indentations, and each indentation has a dimension which is reciprocal to the dimension of a corresponding, desired turbulation site on the inner surface of the passage hole.
25. The method of claim 24, wherein the indentations are filled with a composition comprising a bonding agent and the turbulation material, prior to insertion of the bar into the passage hole.
26. The method of claim 25, wherein the composition further comprises a binder.
27. The method of claim 25, wherein the bonding agent is a braze material.
28. The method of claim 27, wherein the braze material comprises at least one metal selected from the group consisting of nickel, cobalt, iron, a precious metal, and a mixture which includes at least one of the foregoing.
29. The method of claim 27, wherein at least one layer of braze tape is wrapped around the bar after the indentations are filled with the composition, and prior to insertion of the bar in the passage hole.
30. The method of claim 24, wherein the bar comprises a sacrificial material which is removed from the passage hole, after the turbulation material is fused to the inner surface of the passage hole.
31. The method of claim 5, wherein the turbulation material is combined with a bonding agent to form multiple rings of a turbulation-bonding agent composition, prior to step (b); and the rings are then inserted over the bar, so that the bar is encircled by the rings; wherein the rings are spaced from each other in a pre-selected pattern which defines the desired pattern of turbulation for the surface of the passage hole.

32. The method of claim 31, wherein, prior to step (b), sacrificial rings comprising a sacrificial material are inserted over the bar intermittently with the insertion of the turbulation-bonding agent rings, so as to fill spaces which exist between the rings of the turbulation-bonding agent, thereby maintaining a desired separation between the turbulation-bonding agent rings.

33. The method of claim 32, wherein the bar is removed after being inserted into the passage hole, while the turbulation-bonding agent rings and sacrificial rings remain in place within the passage hole.

34. The method of claim 33, wherein the sacrificial rings are removed from the passage hole after the turbulation material is fused to the inner surface of the passage hole.

35. The method of claim 34, wherein the sacrificial rings are removed by a technique selected from the group consisting of aqueous washing; chemical leaching, vacuum extraction, etching, ultrasonic processes, combustion, and combinations of these techniques.

36. The method of claim 31, wherein the bonding agent is a braze composition.

37. The method of claim 5, wherein the bar is a tube which comprises a metal foil, having a first surface and an opposite, second surface.

38. The method of claim 37, wherein the metal foil has a surface area sufficient to cover a portion of the inner surface of the passage hole on which turbulation is desired.

39. The method of claim 37, wherein the metal foil comprises a braze material, and the turbulation material is provided on the first surface of the metal foil.

40. The method of claim 39, wherein the metal foil is rolled into a shape substantially similar to the shape of the passage hole, and is inserted into the passage hole, so that the second surface is adjacent to or in contact with the inner surface of the passage hole, and the turbulation on the first surface of the metal foil becomes attached to the surface of the passage hole, after the fusing step.

41. The method of claim 40, wherein the foil is temporarily held in place within the passage hole by a fastening technique, prior to the fusing step.

* * * * *